US012036480B2

(12) United States Patent
Lucci et al.

(10) Patent No.: US 12,036,480 B2
(45) Date of Patent: Jul. 16, 2024

(54) LOTTERY TICKET HAVING MULTIPLE ZONE PLAY FEATURE

(71) Applicant: IGT GLOBAL SOLUTIONS CORPORATION, Providence, RI (US)

(72) Inventors: Anthony Lucci, North Kingstown, RI (US); Jeffrey Schertzer, Valrico, FL (US)

(73) Assignee: IGT Global Solutions Corporation, Providence, RI (US)

( * ) Notice: Subject to any disclaimer, the term of this patent is extended or adjusted under 35 U.S.C. 154(b) by 168 days.

(21) Appl. No.: 17/482,951

(22) Filed: Sep. 23, 2021

(65) Prior Publication Data

US 2023/0088300 A1 Mar. 23, 2023

(51) Int. Cl.
*A63F 3/06* (2006.01)
*G07F 17/32* (2006.01)

(52) U.S. Cl.
CPC .......... *A63F 3/0665* (2013.01); *G07F 17/329* (2013.01)

(58) Field of Classification Search
CPC .......... A63F 3/06; A63F 3/0605; A63F 3/061; A63F 3/0645; A63F 3/065; A63F 3/0655; G07F 17/329
See application file for complete search history.

(56) References Cited

U.S. PATENT DOCUMENTS

D241,862 S 10/1976 Cloffi
4,252,322 A * 2/1981 Orter ....................... A63F 3/065 273/269
7,347,776 B2 3/2008 Wright
7,530,570 B2 5/2009 Nulph et al.
8,187,072 B2 5/2012 Costello et al.
8,449,374 B2 5/2013 Meyer et al.
10,930,119 B2 2/2021 Moskowitz
2004/0176158 A1 9/2004 Baldwin
2006/0043669 A1 3/2006 Gumina
2006/0043670 A1 3/2006 O'Brien
2006/0119032 A1 6/2006 Scrymgeour et al.
(Continued)

FOREIGN PATENT DOCUMENTS

CN 304776655 8/2018

OTHER PUBLICATIONS

Blackout Bingo 2nd Chance Drawings. [online], [dated 2013], [retrieved on May 5, 2023]. <URL: https://vtlottery.2ndchanceplay.com/game.html?g=1122>. 5 Pages. (Year: 2013).*
(Continued)

*Primary Examiner* — Milap Shah
(74) *Attorney, Agent, or Firm* — Neal, Gerber & Eisenberg LLP

(57) ABSTRACT

A lottery ticket, and a lottery gaming system and method providing a lottery ticket, including a plurality of separate player symbol zones on the substrate, each player symbol zone including a plurality of player first symbols, a plurality of award symbols respectively associated with the plurality of player first symbols, and a player bonus award symbol; a plurality of winning symbols on the substrate; a first removable covering on the substrate covering the plurality of player symbol zones; and a second removable covering on the substrate covering the plurality of winning symbols.

20 Claims, 9 Drawing Sheets

(56) References Cited

U.S. PATENT DOCUMENTS

| | | | | |
|---|---|---|---|---|
| 2008/0042426 | A1* | 2/2008 | Martineck | A63F 3/0665 283/94 |
| 2008/0290596 | A1 | 11/2008 | Bogle | |
| 2011/0227329 | A1 | 9/2011 | Frost | |
| 2014/0375045 | A1 | 12/2014 | Jackson | |
| 2018/0082540 | A1* | 3/2018 | Moskowitz | G07F 17/3288 |
| 2019/0340865 | A1 | 11/2019 | Martineck | |
| 2019/0371115 | A1 | 12/2019 | Jackson | |
| 2020/0078663 | A1 | 3/2020 | Jackson | |
| 2021/0077898 | A1 | 3/2021 | Jackson | |
| 2021/0264719 | A1 | 8/2021 | Jackson | |
| 2022/0309862 | A1 | 9/2022 | Gotlieb | |
| 2023/0085707 | A1 | 3/2023 | Lucci et al. | |
| 2023/0088300 | A1 | 3/2023 | Lucci et al. | |

OTHER PUBLICATIONS

Blackout Bingo by NJ Lottery. [online], [dated 2010], [retrieved on May 5, 2023]. <URL: https://www.state.nj.us/lottery/instant/ig916.htm>. 1 Page. (Year: 2010).*

"20X New Tickets Double Your Money + Big News! Texas Lottery Scratch Offs" by Fixin To Scratch. YouTube—Broadcast Yourself. [dated Jul. 20, 2021], [online], [retrieved on Jan. 19, 2023]. <URL:https://www.youtube.com/watch?v=tCKgAEp8ERM>. 3 Pages. (Year: 2021).*

"Scratch Ticket Details—Game No. 2317—Double Your Money". [online], [retrieved Jan. 19, 2023]. <URL:https://www.texaslottery.com/export/sites/lottery/Games/Scratch_Offs/details.html_252702582.html>. 8 Pages. (Year: 2021).*

"Search Report", from corresponding United Kingdom patent application No. GB2213711.1.

"Illinois Lottery Second Chance Promotion "Deal or No Deal" Lottery Ticket", https://www.illinoislottery.com/games-hub/instant-tickets/deal-or-no-deal, available prior to Sep. 23, 2021 (1 page).

"Texas Lottery Dallas Cowboys Lottery Ticket", https://www.myhighplains.com/entertainment-news/lottery/texas-lottery-dallas-cowboys-team-up-on-new-scratch-ticket-game-and-second-chance-drawings/, available prior to Sep. 23, 2021 (1 page).

"Texas Ruby 7s Lottery Ticket", https://www.txbingo.org/export/sites/lottery/Games/Scratch_Offs/details.html_252704442.html, available prior to Sep. 23, 2021 (1 page).

"Wisconsin Lottery Money Ball Bingo Lottery Ticket", https://wilottery.com/games/instant-games/money-ball-bingo-2181, available prior to Sep. 23, 2021 (1 page).

30 Pack Fake Lottery Tickets, available on Amazon.com, oldest customer review Aug. 20, 2020, URL: https://www.amazon.com/Fake-Lottery-Tickets-Scratch-Cards/dp/B0819993HL/ (Year: 2020), cited in co-pending Design U.S. Appl. No. 29/823,050.

87 Year Old Man Wins, available on freep.com, date published Oct. 5, 2018, URL: https://www.freep.com/story/news/local/michigan/2018/10/05/michigan-lottery-instant-ticket-winner/1532997002/ (Year: 2018), cited in co-pending Design U.S. Appl. No. 29/823,050.

Instant Lottery Tickets Michigan, mlive.com, date published Jan. 29, 2019, URL: https://www.mlive.com/life-and-culture/g66I-2019/01/5cc91f651f991/ here-are-the-top-remaining-instant-lottery-tickets-prizes-in-michigan-for-january-2019.html (Year: 2019), cited in co-pending Design U.S. Appl. No. 29/823,050.

Lottery ticket vector, available on istockphoto.com, upload date Oct. 16, 2019, URL: https://www.istockphoto.com/vector/lottery-ticket-vector-lucky-bingo-card-win-chance-lotto-game-jac-gm1181316566-331279204 (Year: 2019), cited in co-pending Design U.S. Appl. No. 29/823,050.

Lottery Tickets Templates, available on stock.abobe.com, no date available, URL: https://stock.adobe.com/images/scratch-lottery-ticket-vector-design-template/124633501 (Year: 2023), cited in co-pending Design U.S. Appl. No. 29/823,050.

Scratch Lottery Ticket Vector, available on stock.abode.com, no date available, URL: https://stock.adobe.com/images/lottery-tickets-lucky-scratch-bright-glossy-templates-set/196974343 (Year: 2023), cited in co-pending Design U.S. Appl. No. 29/823,050.

"Bingo Multiplier Scratch Ticket", as demonstrated in: Vanbear Slots, "New??? Bingo Multiplier OLG Scratch Ticket Winner 3X", YouTube, https://www.youtube.com/watch?v=ckQkwpcCA4k, Jan. 7, 2020, as cited in the Office Action from corresponding Canadian Patent Application No. 3,133,489, Nov. 16, 2023.

"Office Action", from corresponding Canadian Patent Application No. 3,133,489, Nov. 16, 2023.

* cited by examiner

LOTTERY TICKET HAVING MULTIPLE ZONE PLAY FEATURE

BACKGROUND

The present disclosure relates to a lottery ticket having a multiple zone play feature, and to lottery gaming systems and methods for providing such lottery tickets.

Instant lottery tickets are widely available. Instant lottery tickets may include a predetermined win or lose indicia information under a covering such as a scratch-off-coating ("SOC"). The coverings are used to ensure that the lottery ticket has not been previously used, played, or modified. Millions of different types of instant lottery tickets are produced and sold every year.

BRIEF SUMMARY

In various embodiments, the present disclosure provides a lottery ticket including: a substrate; a plurality of separate player symbol zones on the substrate, each player symbol zone including a plurality of player first symbols, a plurality of award symbols respectively associated with the plurality of player first symbols, and a player bonus award symbol; a plurality of winning symbols on the substrate; a first removable covering on the substrate covering the plurality of player symbol zones; and a second removable covering on the substrate covering the plurality of winning symbols.

In various embodiments, the present disclosure provides a lottery ticket including: a substrate; a plurality of player symbol zones on the substrate, each player symbol zone including: a plurality of player number symbols, a plurality of primary monetary award symbols respectively associated with the plurality of player number symbols, and a player monetary bonus award symbol; a plurality of winning number symbols on the substrate; a first removable covering on the substrate covering the plurality of player symbol zones; a second removable covering on the substrate covering the plurality of winning symbols; and wherein a plurality of awards are associated with the plurality of player symbol zones, the plurality of awards including one of: (i) for one of the player symbol zones, a first type award for any of the winning number symbols that match any of the player number symbols in that player symbol zone, (ii) for one of the player symbol zones, a second type award for the winning number symbols matching all of the player number symbols in that player symbol zone, and (iii) for one of the player symbol zones, a third type award based on the player monetary bonus award symbol and regardless of any of the winning number symbols.

In various embodiments, the present disclosure provides a lottery gaming system including a processor and a memory device that stores a plurality of instructions, that when executed by the processor, cause the processor to cause a lottery ticket to be created, wherein the lottery ticket includes: a substrate; a plurality of player symbol zones on the substrate, each player symbol zone including a plurality of player first symbols, a plurality of award symbols respectively associated with the plurality of player first symbols, and a player monetary bonus award symbol; a plurality of winning symbols on the substrate; a first removable covering on the substrate covering the plurality of player symbol zones; and a second removable covering on the substrate covering the plurality of winning symbols.

Additional features are described in, and will be apparent from, the following Detailed Description and the figures.

DETAILED DESCRIPTION

Figure 1A:
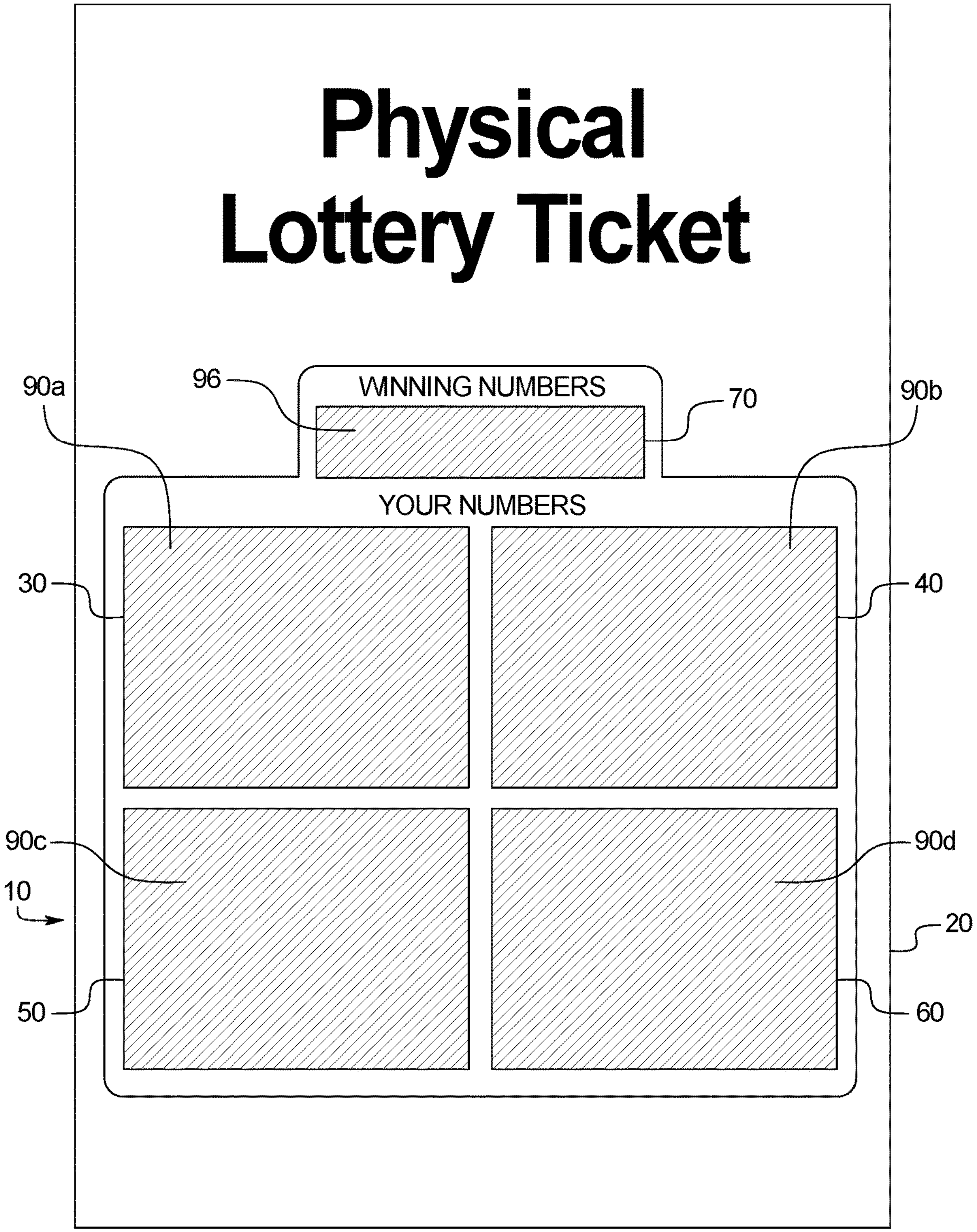
FIGS. 1A and 1B are front views of an example physical lottery ticket of one embodiment of the present disclosure and providing a multiple zone play feature.

In various embodiments, the present disclosure relates generally to lottery tickets having a multiple zone play feature, and a lottery gaming system and a method of operating a lottery gaming system that provides such lottery tickets. In various embodiments of the present disclosure, each lottery ticket provided by the lottery gaming system includes winning symbols and multiple player symbol zones, and can be associated with zero, one, or a plurality of awards. In various embodiments, for each zone of play, a secondary zone of play is overlayed upon the primary play area of that zone.

In various embodiments of the present disclosure, the lottery ticket includes multiple adjacent player symbol zones that each includes: (1) a plurality of player first symbols that are of a first type (such as number symbols) respectively positioned in a plurality of the defined areas in that player symbol zone; (2) a plurality of player award symbols that are of a second type (such as primary monetary award symbols) respectively positioned in the plurality of the defined areas in that player symbol zone and that represent awards associated with the player first symbols; and (3) at least one player bonus symbol that is of a third type of symbol (such as a bonus monetary award symbol) in that player symbol zone and that represents a bonus award associated with that player symbol zone. In various embodiments, for each zone of play, the at least one player bonus symbol provides a secondary zone of play that is overlayed upon the primary play area of that underlying zone of play. The player symbols, player award symbols, and the player bonus symbols can be randomly selected or otherwise suitably determined by the gaming system for each lottery ticket. The player symbol zones can all be configured in an identical manner or can be configured in two or more different manners. The defined areas in each player symbol zone can be all of same size and shape or can be of two or more different sizes and shapes. The bonus area in each player symbols zone can be overlapping in various different manners and can be of the same size and shape as the defined areas or can be of two or more different sizes and shapes. In various embodiments, the bonus area in each player symbols zone overlaps each of the defined areas in that zone. The quantity of defined areas in the player symbol zones can all be the same or two or more quantities can be different.

The lottery ticket additionally includes a plurality of winning symbols (such as winning number symbols) of the first type. The winning symbols can be randomly selected or otherwise suitably determined by the gaming system for each lottery ticket. The quantity of winning symbols can vary and the placement of the winning symbols and winning symbol zone on the lottery ticket can vary.

In various embodiments of the present disclosure, the lottery ticket further includes: (a) a plurality of first coverings (such as a plurality of first scratch-off coatings for the physical lottery ticket) respectively over the multiple player zones; and (b) a second covering (such as a second scratch-off coating for the physical lottery ticket) over the winning symbols.

In various embodiments of the present disclosure, each lottery ticket provides multiple ways for a player of the lottery ticket to potentially win awards (even though any particular lottery ticket may be associated with zero awards, only one award, a plurality of but less than a maximum quantity of potential awards, or the maximum quantity of potential awards. The awards for each lottery ticket can be any suitable awards and can be based on the purchase price for the lottery ticket.

For each player symbol zone, the first way for the player to win an award is via the revealing of the plurality of the winning symbols and a determination of whether any of those winning symbols match any of the player first symbols in that player symbol zone. For this first award determination, the player wins an award for a match of any of the winning symbols with any of the player first symbols in that player zone. For each match of a player first symbol in that player symbol zone, the player wins the award represented by the player award symbol associated with the respective player first symbol in that player symbol zone.

For each player symbol zone, the second way for the player to win an award is via the revealing of the plurality of the winning symbols and a determination of whether all of the winning symbols match all of the player first symbols in that player symbol zone. For this second award determination, the player wins a match-all award for a match of all of the winning symbols to all of the player first symbols in that player symbol zone. An indication of the match-all award can be provided on the lottery ticket in any suitable manner or location such as associated with each player symbol zone or with all of the player symbol zones. The match-all award for each player symbol zone can be the same award or two or more of the match-all awards for the player symbol zones can be different in accordance with the present disclosure.

For each player symbol zone, the third way for the player to win one or more awards is via the revealing of the respective bonus award symbol that is in each player symbol zone. The bonus award symbols can be associated with awards of no award (i.e., $0) or awards of values greater than $0. In various embodiments of the present disclosure, the bonus award symbols and the associated bonus awards are completely independent of the winning symbols for that lottery ticket. In other words, regardless of what the winning symbols are for that lottery ticket, the player can win zero, one, or a plurality of bonus awards for that lottery ticket.

For purposes of explaining the present disclosure and for brevity, in the following described example embodiments, the player first symbols are numbers such as the numbers 1 through 30, the winning symbols are a plurality of the numbers 1 through 30 (such as four of those numbers), the player award symbols are monetary award symbols such as the award symbols $5,000, $1,000, $500, $50, $20, and $5, and the player bonus symbols are monetary award symbols such as the award symbols $100, $50, $25, and $0. Such examples are not meant to limit the present disclosure. In various embodiments, while the monetary award symbols of the player bonus symbols can be $0, all of the monetary award symbols that are player award symbols are greater than $0. This configuration for these embodiments provides that a player zone may not provide the player a bonus award, but for each match of a player symbol with a winning symbol, the player will win an award greater than $0. In various embodiments, the awards structures are otherwise suitably configured.

Figure 1B:
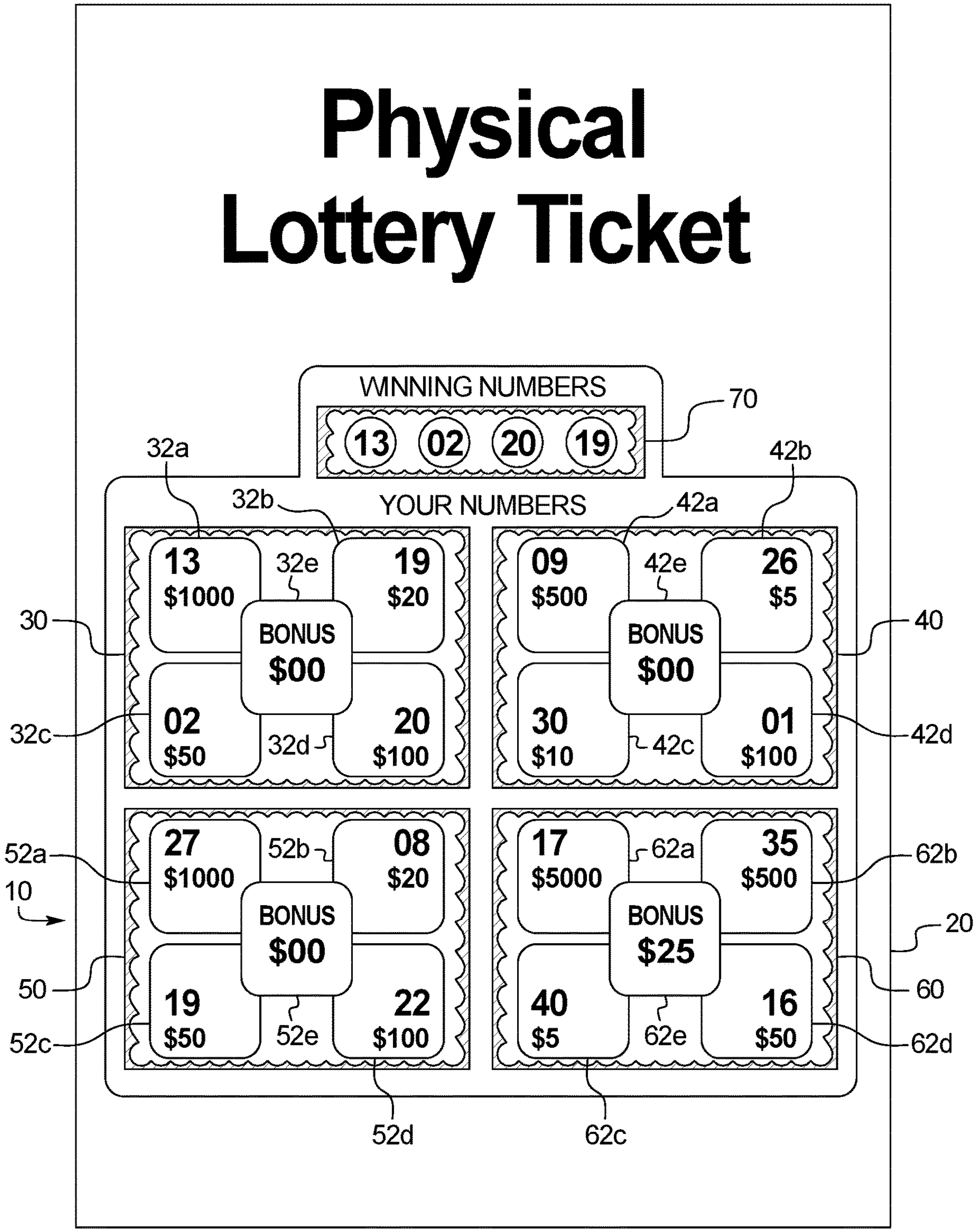

FIGS. 1A and 1B illustrate an example physical lottery ticket 10 of one embodiment of the present disclosure that may be purchased by a player. In this example embodiment, the lottery ticket 10 includes a substrate 20, a plurality of separate player symbol zones 30, 40, 50, and 60 printed on the substrate 20, and a winning numbers area 70 printed on the substrate.

In this example, the first player symbol zone 30 includes: (1) a plurality of defined areas 32_a_, 32_b_, 32_c_, 32_d_, and 32_e_; (2) a plurality of player first number symbols 13, 19, 02, and 20 (not labeled) respectively in the plurality of defined areas 32_a_, 32_b_, 32_c_, and 32_d_; (3) a plurality of player primary monetary award symbols $1,000, $20, $50, and $100 (not labeled) respectively in the plurality of the defined areas 32_a_, 32_b_, 32_c_, and 32_d_ and respectively associated with the plurality of player first number symbols; and (4) a player bonus monetary award symbol $00 (not labeled) in the defined area 32_e_. In this example embodiment, the player bonus monetary award symbol $00 (not labeled) in the defined area 32_e_ provides a secondary zone of play that is overlayed upon the primary play area of the underlying zone of play.

Likewise, the second player symbol zone 40 includes: (1) a plurality of defined areas 42_a_, 42_b_, 42_c_, 42_d_, and 42_e_; (2) a plurality of player first number symbols 09, 26, 30, and 01 (not labeled) respectively in the plurality of defined areas 42_a_, 42_b_, 42_c_, and 42_d_; (3) a plurality of player primary monetary award symbols $500, $5, $10, and $100 (not labeled), and 46_d_ respectively in the plurality of the defined areas 42_a_, 42_b_, 42_c_, and 42_d_ and respectively associated with the plurality of player first number symbols; and (4) a player bonus monetary award symbol $00 (not labeled) in the defined area 42_e_. In this example embodiment, the player bonus monetary award symbol $00 (not labeled) in the defined area 42_e_ provides a secondary zone of play that is overlayed upon the primary play area of the underlying zone of play.

Likewise, the third player symbol zone 50 includes: (1) a plurality of defined areas 52_a_, 52_b_, 52_c_, 52_d_, and 52_e_; (2) a plurality of player first number symbols 27, 08, 19, and 22 (not labeled) respectively in the plurality of defined areas 52_a_, 52_b_, 52_c_, and 52_d_; (3) a plurality of player primary monetary award symbols $1,000, $20, $50, and $100 (not labeled) respectively in the plurality of the defined areas 52_a_, 52_b_, 52_c_, and 52_d_ and respectively associated with the plurality of player first number symbols; and (4) a player bonus monetary award symbol $00 (not labeled) in the defined area 52_e_. In this example embodiment, the player bonus monetary award symbol $00 (not labeled) in the defined area 52_e_ provides a secondary zone of play that is overlayed upon the primary play area of the underlying zone of play.

Likewise, the fourth player symbol zone 60 includes: (1) a plurality of defined areas 62*a*, 62*b*, 62*c*, 62*d*, and 62*e*; (2) a plurality of player first number symbols 17, 35, 40, and 16 (not labeled) respectively in the plurality of defined areas 62*a*, 62*b*, 62*c*, and 62*d*; (3) a plurality of player primary monetary award symbols $5,000, $500, $5, and $50 (not labeled) respectively in the plurality of the defined areas 62*a*, 62*b*, 62*c*, and 62*d* and respectively associated with the plurality of player first number symbols; and (4) a player bonus monetary award symbol $25 (not labeled) in the defined area 62*e*. In this example embodiment, the player bonus monetary award symbol $25 (not labeled) in the defined area 62*e* provides a secondary zone of play that is overlayed upon the primary play area of the underlying zone of play.

Although not shown in this example, the lottery ticket can include one or more match all award symbols (such as one match all award for any player symbol zone on the lottery ticket, or four match all awards associated with the respective four player zones).

As shown in FIG. 1A, the physical lottery ticket 10 further includes first scratch-off coatings 90*a*, 90*b*, 90*c*, and 90*d* applied on the substrate 20 and initially respectively covering the player symbol zones 30, 40, 50, and 60 and a second scratch-off coating 96 applied on the substrate 20 and initially covering the winning number area 70. FIG. 1B shows the physical lottery ticket 10 with the first scratch-off coatings 90*a*, 90*b*, 90*c*, and 90*d* removed from the player symbol zones 30, 40, 50, and 60 as well as the second scratch-off coating 96 removed from the winning symbol area 70.

It should be appreciated that the quantity of player zones, defined areas in each player zone, player first number symbols in each player zone, the player primary monetary award symbols in each player zone, and the player bonus monetary award symbol in each player zone can vary in accordance with the present disclosure. It should also be appreciated that in various embodiments, the lottery ticket can include and thus display additional information, such as lottery ticket identification information and/or any other relevant lottery ticket related information. It should further be appreciated that physical lottery ticket 10 can be manufactured in various known or new manners for producing physical lottery tickets.

Figure 2:
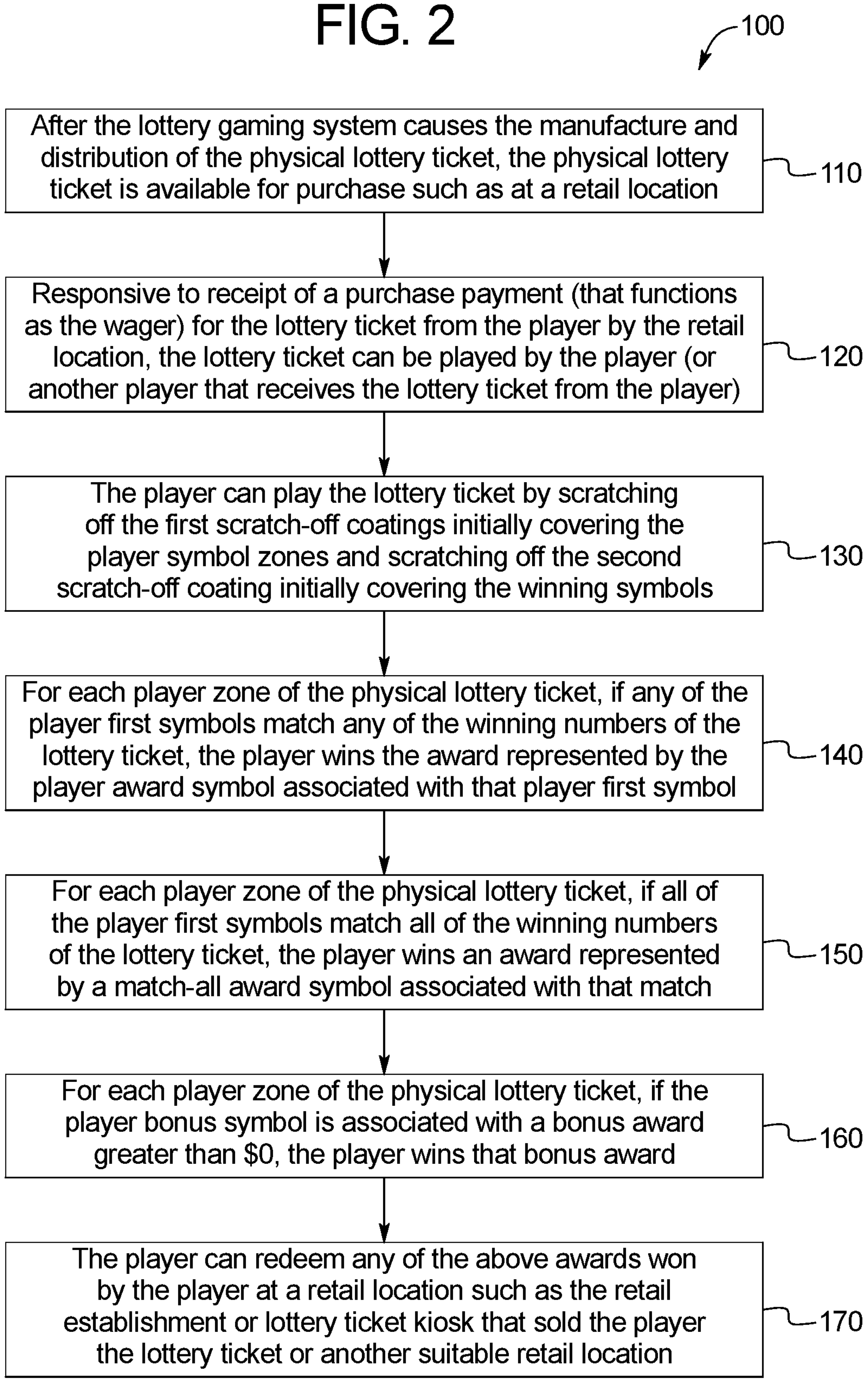
FIG. 2 is a flowchart of an example method of providing the example physical lottery ticket of FIG. 1.

FIG. 2 is a flowchart of an example method 100 of providing the example physical lottery ticket of the present disclosure.

In the example method illustrated in FIG. 2, after the lottery gaming system causes the manufacture and distribution of the physical lottery ticket, the physical lottery ticket is available for purchase such as at a retail location, as indicated by block 110. The retail location can, for example, be a retail establishment that sells lottery tickets or can be an electronic lottery ticket provider such as lottery ticket kiosk.

Responsive to receipt of a purchase payment (that functions as the wager) for the lottery ticket from the player by the retail location, the lottery ticket can be played by the player (or another player that receives the lottery ticket from the player), as indicated by block 120.

The player can play the lottery ticket by scratching off the first scratch-off coatings initially covering the player symbol zones and scratching off the second scratch-off coating initially covering the winning symbols, as indicated by block 130. The player can do this in any suitable order.

For each player zone of the physical lottery ticket, if any of the player first symbols match any of the winning numbers of the lottery ticket, the player wins the award represented by the player award symbol associated with that player first symbol, as indicated by block 140.

For each player zone of the physical lottery ticket, if all of the player first symbols match all of the winning numbers of the lottery ticket, the player wins an award represented by a match-all award symbol associated with that match, as indicated by block 150.

For each player zone of the physical lottery ticket, if the player bonus symbol is associated with a bonus award greater than $0, the player wins that bonus award, as indicated by block 160. This award determination is completely independent from the winning numbers in this example embodiment.

In the example method illustrated in FIG. 2, the player can redeem any of the above awards won by the player at a retail location such as the retail establishment or lottery ticket kiosk that sold the player the lottery ticket or another suitable retail location, as indicated by block 170.

For the example lottery ticket 10, for the first player zone 30, (1) the player first symbols 13, 19, 02, and 20 all match the winning numbers 13, 02, 20, and 19 of the lottery ticket 10, and the player wins the awards represented by the player award symbols $1,000, $20, $50, and $100 respectively associated with the player first symbols 13, 19, 02, and 20 for this first player zone 30; (2) all of the player first symbols 13, 19, 02, and 20 match all of the winning numbers 13, 02, 20, and 19 of the lottery ticket 10, and the player wins a match-all award of $5000 (not shown) for this first player zone 30; and (3) the player bonus symbol is associated with a bonus award of $00, so the player does not win any bonus award for this first player zone 30.

For the example lottery ticket 10, for the second player zone 40, (1) none of the player first symbols 09, 26, 30, and 01 match any of the winning numbers 13, 02, 20, and 19 of the lottery ticket 10, and thus the player does not win any of the awards represented by the player award symbols $500, $5, $10, and $100 respectively associated with the player first symbols 09, 26, 30, and 01 for this second player zone 40; (2) since none of the player first symbols 09, 26, 30, and 01 match any of the winning numbers 13, 02, 20, and 19 of the lottery ticket 10, the player does not win any match-all award for this second player zone 40; and (3) the player bonus symbol is associated with a bonus award of $00, so the player does not win any bonus award for this second player zone 40.

For the example lottery ticket 10, for the third player zone 50: (1) only one of the player first symbols 27, 08, 19, and 22 matches any of the winning numbers 13, 02, 20, and 19 of the lottery ticket 10, and thus the player only wins the award of $50 associated with the player first symbol 19 for this third player zone 50; (2) since only one of the player first symbols 27, 08, 19, and 22 match any of the winning numbers 13, 02, 20, and 19 of the lottery ticket 10, the player does not win any match-all award for this third player zone 50; and (3) the player bonus symbol is associated with a bonus award of $00, so the player does not win any bonus award for this third player zone 50.

For the example lottery ticket 10, for the fourth player zone 60, (1) none of the player first symbols 17, 35, 40, and 16 match any of the winning numbers 13, 02, 20, and 19 of the lottery ticket 10, and thus the player does not win any of the awards represented by the player award symbols $5,000, $500, $15, and $50 respectively associated with the player first symbols 17, 35, 40, and 16 for this fourth player zone 60; (2) since none of the player first symbols 17, 35, 40, and 16 match any of the winning numbers 13, 02, 20, and 19 of the lottery ticket 10, the player does not win any match-all award for this fourth player zone 60; and (3) the player bonus symbol is associated with a bonus award of $25, so the player wins a $25 bonus award for this fourth player zone 60.

Figure 3A:
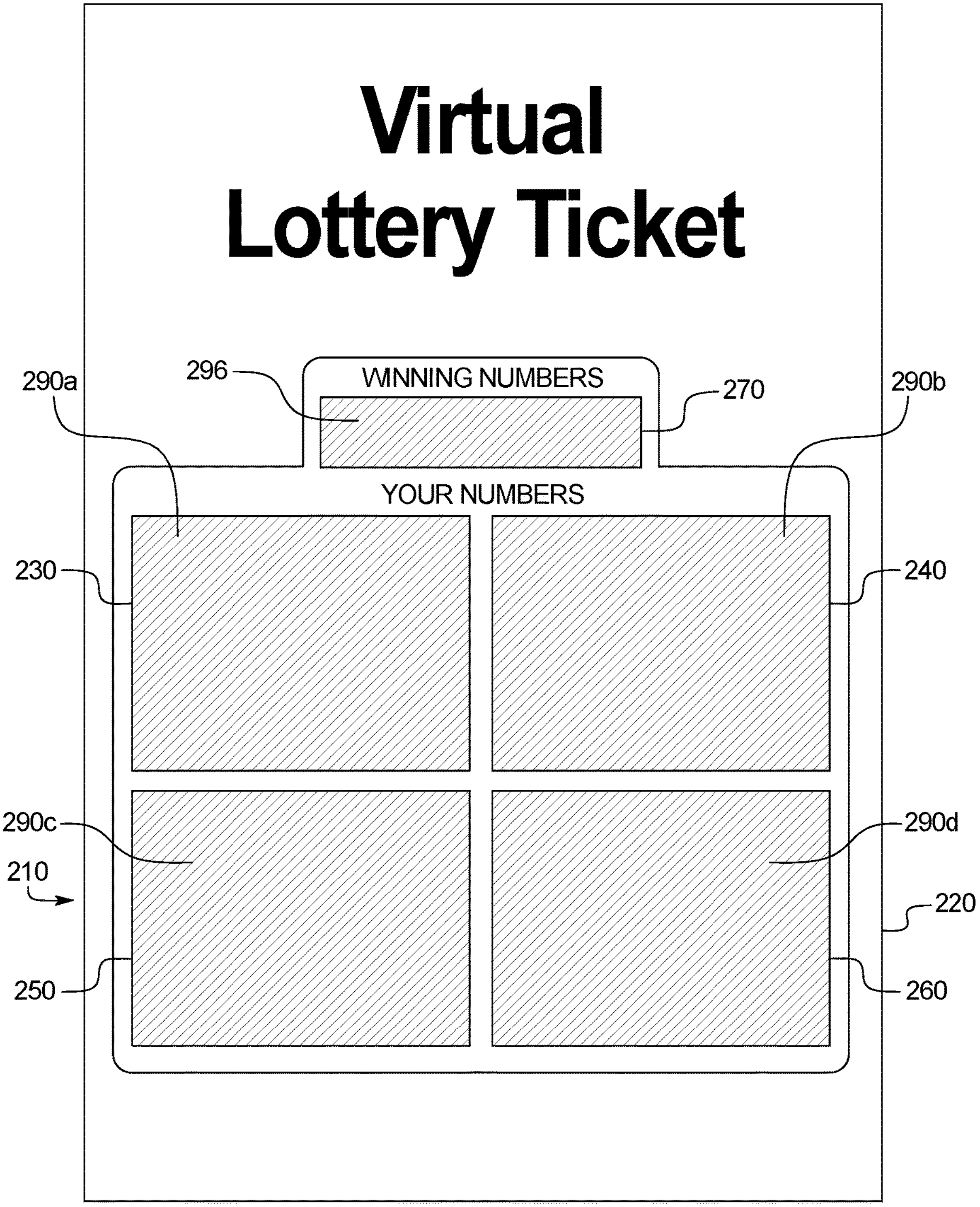
FIGS. 3A and 3B are front views of an example virtual lottery ticket of one embodiment of the present disclosure and providing a multiple zone play feature.
Figure 3B:
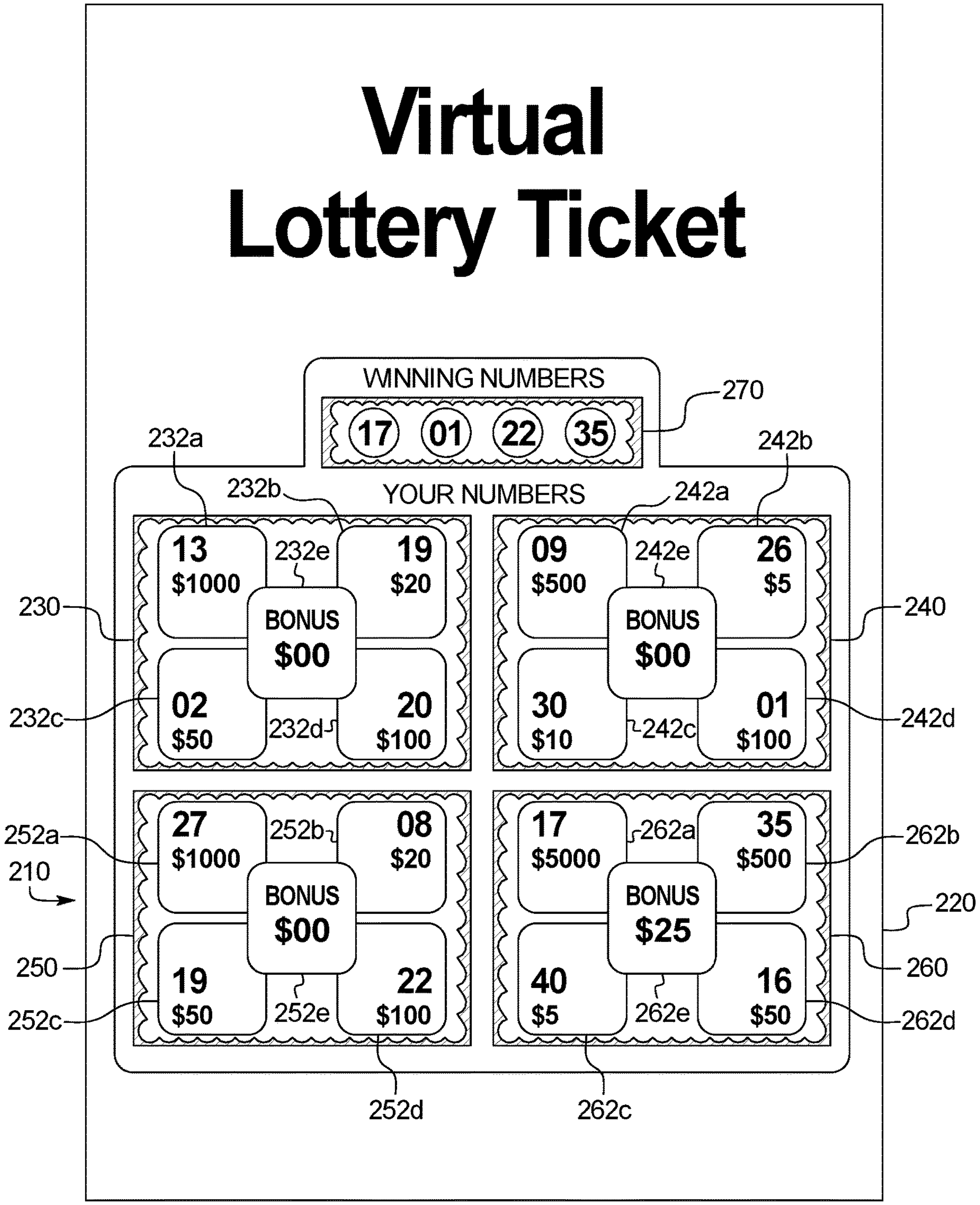

FIGS. 3A and 3B illustrate an example virtual lottery ticket 210 of the present disclosure that may be purchased by a player. In this example embodiment, the virtual lottery ticket 210 includes a substrate 220, a plurality of separate player symbol zones 230, 240, 250, and 260 on the substrate 220, and a winning numbers area 270 on the substrate. The virtual lottery ticket 210 further includes a plurality of first coverings 290*a*, 290*b*, 290*c*, and 290*d* initially covering the player symbol zones 230, 240, 250, and 260 and a second covering 296 initially covering the winning symbol in the winning symbols area 270 as shown in FIG. 3A. FIG. 3B shows the virtual lottery ticket 10 with the first coverings 290*a*, 290*b*, 290*c*, and 290*d* removed from the player symbol zones 230, 240, 250, and 260 and the second covering 296 removed from the winning number area 270. These coverings can be removed by a suitable player input related to the virtual lottery ticket. It should be appreciated that in various embodiments, the virtual lottery ticket can include and thus display additional information, such as virtual lottery ticket identification information and/or any other relevant virtual lottery ticket related information. It should be appreciated that the virtual lottery ticket 210 can be manufactured in various known or new manners for producing virtual lottery tickets.

The first player symbol zone 230 includes: (1) a plurality of defined areas 232*a*, 232*b*, 232*c*, 232*d*, and 232*e*; (2) a plurality of player first number symbols 13, 19, 02, and 20 (not labeled) respectively in the plurality of defined areas 232*a*, 232*b*, 232*c*, and 232*d*; (3) a plurality of player primary monetary award symbols $1,000, $20, $50, and $100 (not labeled) respectively in the plurality of the defined areas 232*a*, 232*b*, 232*c*, and 232*d* and respectively associated with the plurality of player first number symbols 13, 19, 02, and 20; and (4) a player bonus monetary award symbol $00 (not labeled) in the defined area 232*e*. In this example embodiment, the player bonus monetary award symbol $00 (not labeled) in the defined area 232*e* provides a secondary zone of play that is overlayed upon the primary play area of the underlying zone of play.

Likewise, the second player symbol zone 240 includes: (1) a plurality of defined areas 242*a*, 242*b*, 242*c*, 242*d*, and 242*e*; (2) a plurality of player first number symbols 09, 26, 30, and 01 (not labeled) respectively in the plurality of defined areas 242*a*, 242*b*, 242*c*, and 242*d*; (3) a plurality of player primary monetary award symbols $500, $5, $10, and $100 respectively in the plurality of the defined areas 242*a*, 242*b*, 242*c*, and 242*d* and respectively associated with the plurality of player first number symbols 09, 26, 30, and 01; and (4) a player bonus monetary award symbol $00 (not labeled) in the defined area 242*e*. In this example embodiment, the player bonus monetary award symbol $00 (not labeled) in the defined area 242*e* provides a secondary zone of play that is overlayed upon the primary play area of the underlying zone of play.

Likewise, the third player symbol zone 250 includes: (1) a plurality of defined areas 252*a*, 252*b*, 252*c*, 252*d*, and 252*e*; (2) a plurality of player first number symbols 27, 08, 19, and 22 (not labeled), respectively in the plurality of defined areas 252*a*, 252*b*, 252*c*, and 252*d*; (3) a plurality of player primary monetary award symbols $1,000, $20, $50, and $100 (not labeled) respectively in the plurality of the defined areas 252*a*, 252*b*, 252*c*, and 252*d* and respectively associated with the plurality of player first number symbols 27, 08, 19, and 22; and (4) a player bonus monetary award symbol $00 (not labeled) in the defined area 252*e*. In this example embodiment, the player bonus monetary award symbol $00 (not labeled) in the defined area 252*e* provides a secondary zone of play that is overlayed upon the primary play area of the underlying zone of play.

Likewise, the fourth player symbol zone 260 includes: (1) a plurality of defined areas 262*a*, 262*b*, 262*c*, 262*d*, and 262*e*; (2) a plurality of player first number symbols 17, 35, 40, and 16 (not labeled) respectively in the plurality of defined areas 262*a*, 262*b*, 262*c*, and 262*d*; (3) a plurality of player primary monetary award symbols $5000, $500, $5, and $50 respectively in the plurality of the defined areas 262*a*, 262*b*, 262*c*, and 262*d* and respectively associated with the plurality of player first number symbols 17, 35, 40, and 16; and (4) a player bonus monetary award symbol $25 in the defined area 262*e*. In this example embodiment, the player bonus monetary award symbol $25 (not labeled) in the defined area 262*e* provides a secondary zone of play that is overlayed upon the primary play area of the underlying zone of play.

In this example, for brevity and simplicity, the virtual lottery ticket 210 and the physical lottery ticket 10 have the same zones, the same defined areas, the same player first number symbols, the same player primary monetary award symbols, and the same player bonus monetary award symbols, but different winning numbers.

Although not shown in this example, the lottery ticket may include one or more match all award symbols (such as one match all award for any player symbol zone on the lottery ticket, or four match all awards associated with the four player zones).

Figure 4:
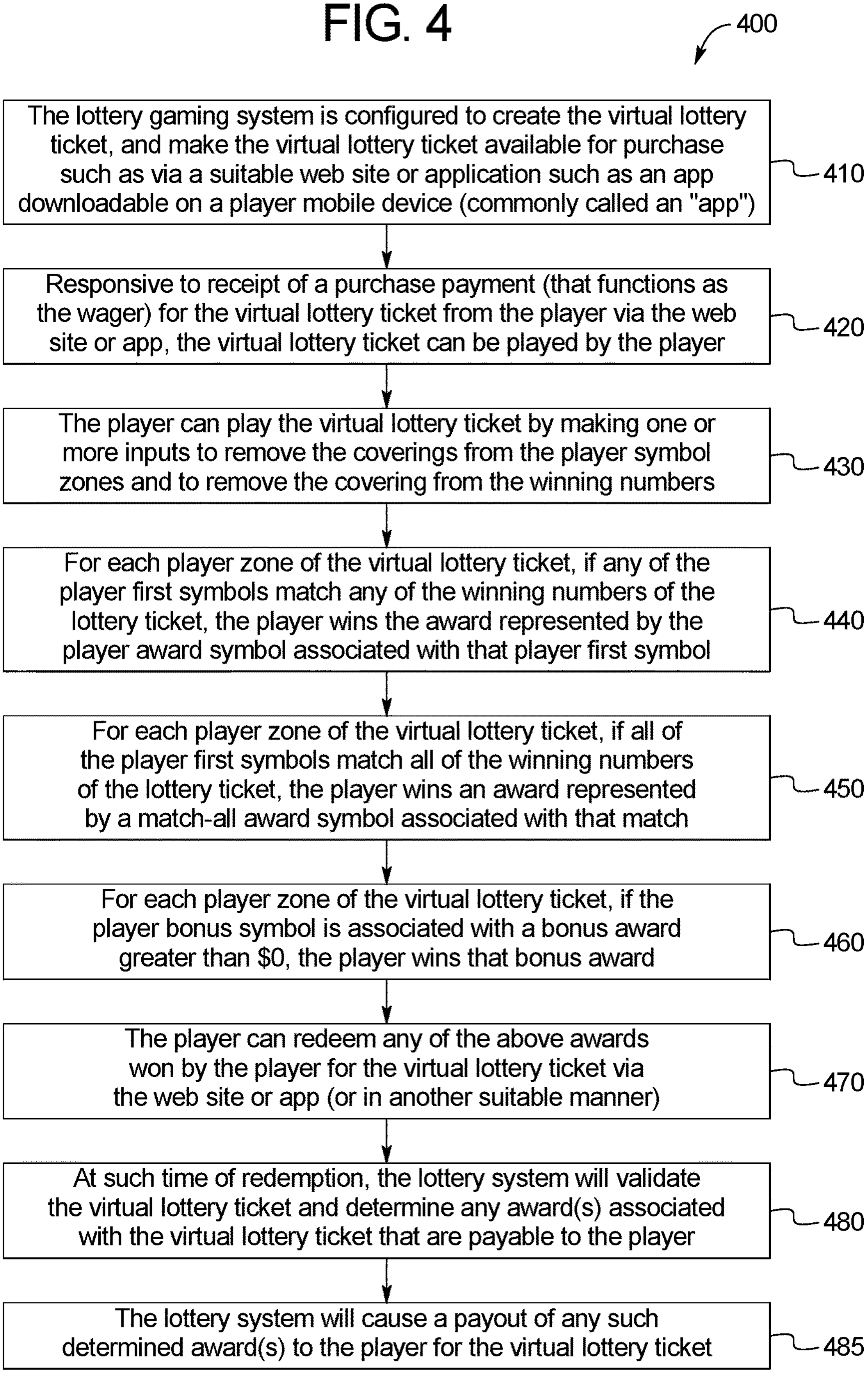
FIG. 4 is a flowchart of an example method of providing the example virtual lottery ticket of FIG. 1.

FIG. 4 is a flowchart of an example method 400 of operating an example lottery system of the of the present disclosure that can provide the virtual lottery ticket 210. In various embodiments, the method is represented by a set of instructions stored in one or more memory devices and executed by one or more processors. Although the method is described with reference to the flowchart shown in FIG. 4, many other processes of performing the acts associated with this illustrated example method may be employed. For example, the order of certain of the illustrated blocks may be changed, certain of the illustrated blocks may be optional, or certain of the illustrated blocks may not be employed.

In the example embodiment illustrated in FIG. 4, the lottery gaming system is configured to create the virtual lottery ticket, and make the virtual lottery ticket available for purchase such as via a suitable web site or application such as an app downloadable on a player mobile device (commonly called an "app"), as indicated by block 410. The web site or app can be any suitable web site or app that provides and sells virtual lottery tickets.

Responsive to receipt of a purchase payment (that functions as the wager) for the virtual lottery ticket from the player via the web site or app, the virtual lottery ticket can be played by the player, as indicated by block 420. It should be appreciated that the lottery gaming system can alternatively, after receiving a purchase payment (that functions as the wager) for the virtual lottery ticket from the player, then create the virtual lottery ticket for the player, store data associated with the virtual lottery ticket, and provide the player a virtual copy of the virtual lottery ticket. Thus, it should be appreciated that in various example embodiments, the player may purchase a virtual lottery ticket with a personal mobile device and, thus, may not be provided with a physical (i.e., paper) lottery ticket.

The player can play the virtual lottery ticket by making one or more inputs to remove the coverings from the player symbol zones and to remove the covering from the winning numbers, as indicated by block 430. The player can do this in any suitable order or manner in accordance with the present disclosure.

For each player zone of the virtual lottery ticket, if any of the player first symbols match any of the winning numbers of the lottery ticket, the player wins the award represented by the player award symbol associated with that player first symbol, as indicated by block 440.

For each player zone of the virtual lottery ticket, if all of the player first symbols match all of the winning numbers of the lottery ticket, the player wins an award represented by a match-all award symbol associated with that match, as indicated by block 450.

For each player zone of the virtual lottery ticket, if the player bonus symbol is associated with a bonus award greater than $0, the player wins that bonus award, as indicated by block 460.

In the example method illustrated in FIG. 4, the player can redeem any of the above awards won by the player for the virtual lottery ticket via the web site or app (or in another suitable manner), as indicated by block 470. At such time of redemption, the lottery system will validate the virtual lottery ticket and determine any award(s) associated with the virtual lottery ticket that are payable to the player, as indicated by block 480. The lottery system will cause a payout of any such determined award(s) to the player for the virtual lottery ticket, as indicated by block 485.

For the example lottery ticket 210, for the first player zone 230, (1) none of the player first symbols 13, 19, 02, and 20 match any of the winning numbers 17, 01, 22, and 35 of the lottery ticket 10, and the player does not win any of the awards represented by the player award symbol $1,000, $20, $50, and $100 respectively associated with the player first symbols 13, 19, 02, and 20 for this first player zone 230; (2) the player first symbols 13, 19, 02, and 20 do not match all of the winning numbers 17, 01, 22, and 35 of the lottery ticket 10, and the player does not win a match-all award for this first player zone 230; and (3) the player bonus symbol is associated with a bonus award of $00, so the player does not win any bonus award for this first player zone 230.

For the example lottery ticket 210, for the second player zone 240, (1) one of the player first symbols 09, 26, 30, and 01 match one of the winning numbers 17, 01, 22, and 35 of the lottery ticket 10, and thus the player wins the award represented by the player award symbol $100 associated with the player first symbol 01 for this second player zone 240; (2) since not all of the player first symbols 09, 26, 30, and 01 match all of the winning numbers 17, 01, 22, and 35 of the lottery ticket 10, the player does not win any match-all award for this second player zone 210; and (3) the player bonus symbol is associated with a bonus award of $00, so the player does not win any bonus award for this second player zone 240.

For the example lottery ticket 210, for the third player zone 250: (1) only one of the player first symbols 27, 08, 19, and 22 match any of the winning numbers 17, 01, 22, and 35 of the lottery ticket 10, and thus the player only wins the award of $50 associated with the player first symbol 19 for this third player zone 250; (2) since not all of the player first symbols 27, 08, 19, and 22 match all of the winning numbers 17, 01, 22, and 35 of the lottery ticket 10, the player does not win any match-all award for this third player zone 50; and (3) the player bonus symbol is associated with a bonus award of $00, so the player does not win any bonus award for this third player zone 250.

For the example lottery ticket 210, for the fourth player zone 260, (1) one of the player first symbols 17, 35, 40, and 16 matches one of the winning numbers 17, 01, 22, and 35 of the lottery ticket 10, and thus the player wins the award represented by the player award symbol $5,000 associated with the player first symbol 17 for this fourth player zone 260; (2) since not all of the player first symbols 17, 35, 40, and 16 match all of the winning numbers 17, 01, 22, and 35 of the lottery ticket 10, the player does not win the match-all award for this fourth player zone 260; and (3) the player bonus symbol is associated with a bonus award of $25, so the player wins a $25 bonus award for this fourth player zone 260.

Figure 5:
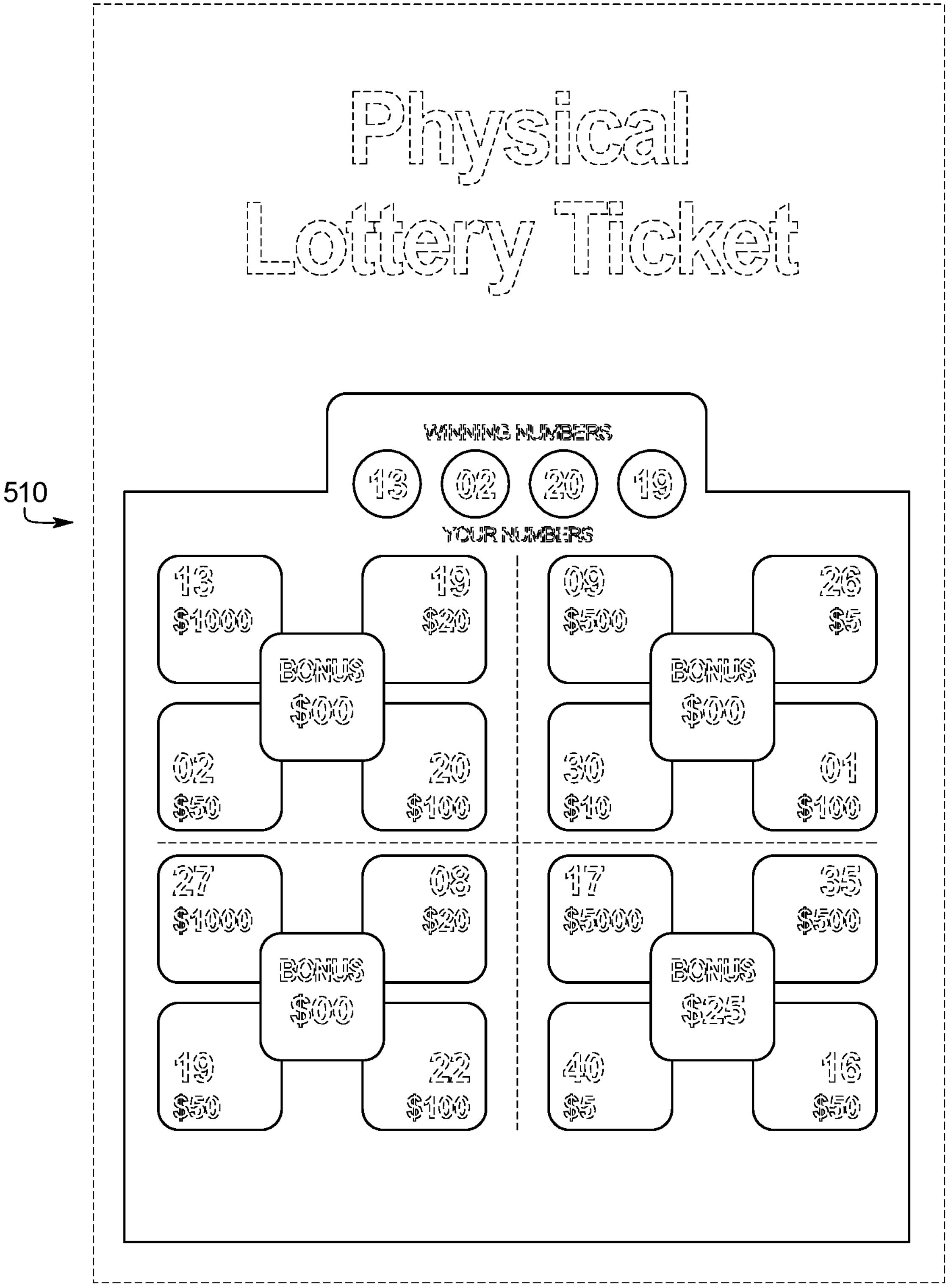
FIG. 5 is a front view of another example lottery ticket of one embodiment of the present disclosure providing a multiple zone play feature.

FIG. 5 illustrates another example lottery ticket 510 of one embodiment of the present disclosure that may be purchased by a player. In this example embodiment, the lottery ticket 510 includes a substrate, a plurality of four player symbol zones on the substrate, and winning symbols on the substrate. In this example, there is less demarcation between the zones as shown in phantom. The lottery ticket 510 further includes first coverings (not shown) initially covering the player symbol zones and a second covering initially covering the winning symbols. It should be appreciated that in various embodiments, the lottery ticket can include and thus display additional information, such as lottery ticket identification information and/or any other relevant lottery ticket related information. It should be appreciated that the lottery ticket 510 can be manufactured in various known or new manners for producing lottery tickets.

Figure 6:
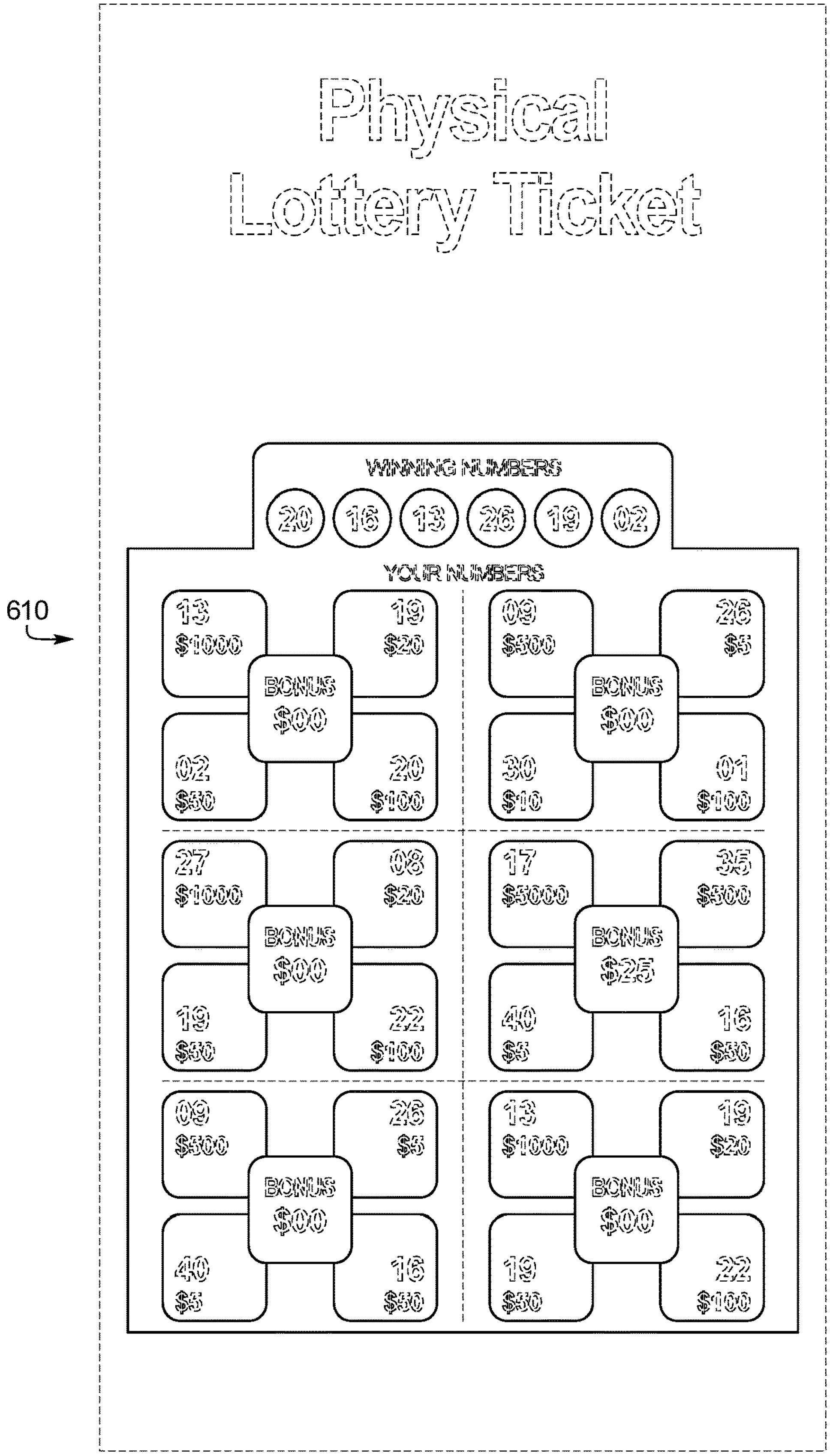
FIG. 6 is a front view of another example lottery ticket of one embodiment of the present disclosure providing a multiple zone play feature.

FIG. 6 illustrates another example lottery ticket 610 of one embodiment of the present disclosure that may be purchased by a player. In this example embodiment, the lottery ticket 610 includes a substrate, a plurality of six separate player symbol zones on the substrate, and winning symbols on the substrate. The lottery ticket 610 further includes first coverings (not shown) initially covering the player symbol zones and a second covering initially covering the winning symbols. It should be appreciated that in various embodiments, the lottery ticket can include and thus display additional information, such as lottery ticket identification information and/or any other relevant lottery ticket related information. It should be appreciated that the lottery ticket 610 can be manufactured in various known or new manners for producing lottery tickets.

Example lottery tickets 510 and 610 show that the designs and configurations of such tickets can vary in accordance with the present disclosure.

It should thus be appreciated from the above that the present disclosure contemplates that: (1) the quantity of player symbol zones can vary (i.e., be more or less than the above described player zones; (2) the player zones and symbol areas can be of alternative sizes; (3) the quantity of player first symbols in two or more of the player symbol zones can vary (i.e., be more or less than the above described player zones; (4) the player zones can be of alternative sizes; and (5) the player symbol zones of a lottery ticket do not need to be of equal size and can include different quantities of player first symbols.

Example Lottery Gaming Systems—General

In various embodiments of the present disclosure, the lottery gaming system and method are configured to be provided by a lottery agency (such as a state lottery agency).

In various other embodiments of the present disclosure, the lottery gaming system and method are configured to be operated by a third party that runs the lottery for a lottery agency (such as a state lottery agency).

Figure 7:
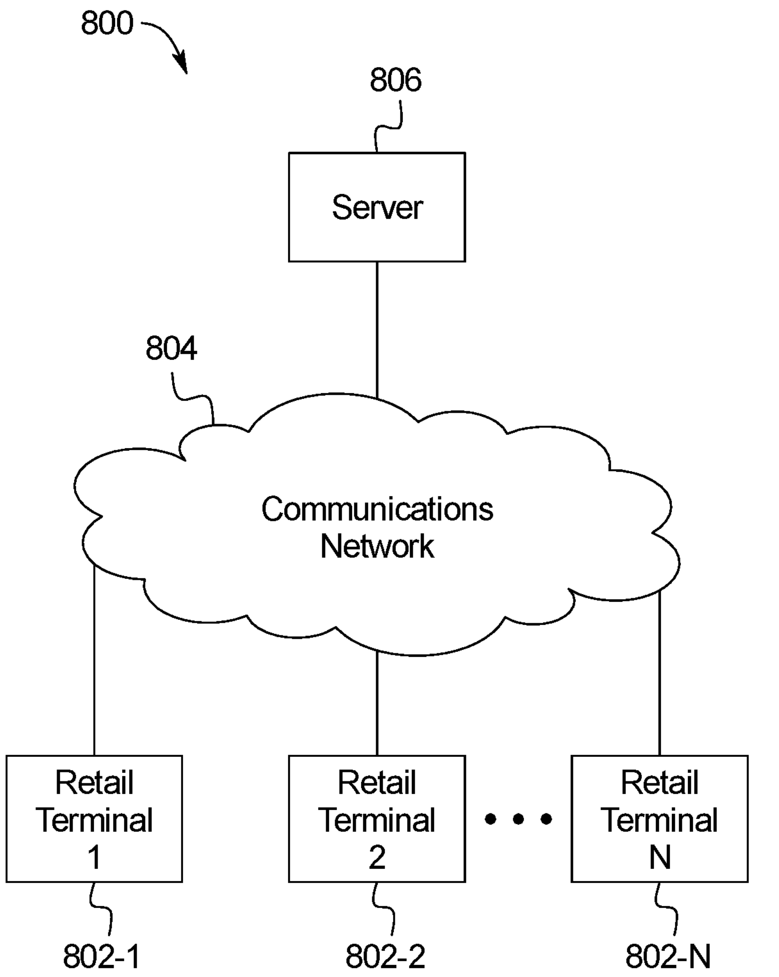
FIG. 7 depicts an example lottery gaming system of one embodiment of the present disclosure.

FIG. 7 illustrates an example networked lottery gaming system 800 for certain types of lottery ticket implementations. This example network lottery gaming system 800 generally includes: (1) a plurality of lottery retailer terminals 802-1 to 802-N; (2) a communications network 804; and (3) one or more lottery servers such as lottery server 806. Generally, the retailer terminals 802-1 to 802-N and the lottery server 806 are configured to perform certain functions described above and further described below.

In various embodiments of the lottery gaming systems and methods of the present disclosure, the player can purchase a respective physical or virtual lottery ticket via a suitable manner such as, but not limited to, one of the following: (1) a dedicated lottery kiosk (e.g., a lottery kiosk) configured to communicate over a data network (such as the Internet) to a lottery server (such as a lottery server 806 described below in connection with FIG. 7); (2) a retailer-operated lottery terminal configured to communicate over a data network (such as the Internet) to a lottery server (such as a lottery server 806 described below in connection with FIG. 7); (3) a personal computer configured to communicate over a data network (such as the Internet) to a lottery server (such as a lottery server 806 described below in connection with FIG. 7); and/or (4) a personal mobile device (such as a cellular telephone, tablet, or PDA) configured to communicate over a data network (such as a wireless or cellular data network) to a lottery server (such as a lottery server 806 described below in connection with FIG. 7).

In the example embodiment of FIG. 7, each retailer terminal 802 corresponds to (or is associated with) a particular lottery retailer. For example, the first retailer terminal 802-1 of FIG. 7 may be associated with a first lottery retailer, such as a convenience store, and the second retailer terminal 802-2 of FIG. 7 may be associated with a second lottery retailer, such as a supermarket. It should be understood that any suitable quantity of lottery retailer terminals may be employed in the lottery gaming system 800, along with any suitable quantity of corresponding lottery servers 806.

In various example embodiments, the lottery retailer terminal 802 includes one or more processor(s). Generally, the processor is operative to perform or process instructions, and in particular, to operate in accordance with the various methods described herein. For example, the processor of the lottery retailer terminal 802 may be operable to enable the lottery retailer terminal 802 to transmit data to (and receive data from) the lottery server 806. More specifically, the processor may enable the transmission of data representing each lottery ticket such as upon a player redeeming a physical lottery ticket at such lottery retailer.

In various example embodiments, the lottery retailer terminal 802 includes one or more input device(s). The input devices of the lottery retailer terminal 802 may include components such as an optical scanner and/or a barcode scanner, for reading and/or for deriving information associated with a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of one or more of the lottery retailer terminals 802 may include a clock. The clock may be employed to detect, derive and/or append time and/or date information for use by the lottery server 806 to: (i) create a data record corresponding to lottery tickets purchased or redeemed at the lottery retailer terminal 802, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, one or more of the lottery retailer terminals 802 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, one or more of the lottery retailer terminals 802 also includes one or more communications port(s), such as a serial port, a modem or the like. Generally, the communications port of the lottery retailer terminal 802 may be operable to facilitate two-way data communications between (i) the lottery retailer terminal 802, and (ii) the lottery server 806. In accordance with some embodiments, the communications port of the lottery retailer terminal 802 may operate to facilitate the transmission of information between the lottery retailer terminal and a player device such as a personal digital assistant (PDA), cell phone and/or a dedicated (e.g., a proprietary) device.

In various example embodiments, one or more of the lottery retailer terminals 802 includes a data storage device such as a hard disk, optical or magnetic media, random access memory (RAM) and/or read-only memory (ROM), or the like memory device. Generally, the data storage device of the lottery retailer terminal 802 stores a software program, the software program enabling a processor of the retailer terminal 802 to perform various functions including some or all of the various steps described herein. For example, in accordance with certain embodiments, the lottery retailer terminal 802 may be configured to perform some or all of the functions of the lottery server 806 (and vice versa) such that the lottery server 806 and the lottery retailer terminal 802 may be considered as the same "device."

In various example embodiments, a lottery ticket sales device may be utilized in place of a lottery retailer terminal 802. Such a lottery ticket sales device may be implemented as a lottery server, a controller, a dedicated hardware circuit, an appropriately programmed general-purpose computer, or any other equivalent electronic, mechanical or electro-mechanical device. Thus, in various embodiments, a lottery ticket sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery ticket sales device may include any or all of the devices of the aforementioned systems.

In this example embodiment, the lottery server 806 operates to: (1) receive and/or store data associated with one or more lottery tickets including such data as: (a) ticket identifier(s), and (b) ticket indicia; (2) determine at least a first redemption amount associated with a lottery ticket; (3)

receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 806 includes one or more processor(s). Such a processor functions to process instructions, and in particular, to operate in accordance with various methods described herein. For example, the processor may operate to enable the lottery server 806 to transmit data to (and receive data from) the lottery retailer terminal 802. More specifically, the processor of the lottery server 806 may enable the transmission of data representing a lottery ticket, as well as information defining one or more payout(s) associated with that lottery ticket to or by a specific one of the lottery retailer terminals 802 shown in the lottery network 800 of FIG. 7. Thus, the lottery server 806 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 806 includes one or more input device(s). Examples of such input devices include a keypad, a mouse, a touch-screen, a random number generator, a microphone, and other digital or analog input devices.

In various example embodiments, the lottery server 806 also includes one or more output device(s). Example of output device(s) of the lottery server 806 include a monitor or other display for outputting information to an operator of the lottery server 806 (e.g., for displaying information such as statistical or sales data, win and loss information and/or payout amounts), a printer for producing a physical record (e.g., a report) of such data, and the like. In addition, the lottery server 806 may include one or more communications ports, such as a serial port, modem or the like, operable to facilitate two-way data communications between (i) the lottery server 806 and (ii) one or more lottery retailer terminals 802.

In various example embodiments, the lottery server 806 includes a data storage device (e.g., a hard disk or hard drive, a media-based (removable) memory, or the like). In certain embodiments, the data storage device of the lottery server 806 stores at least one software program, which includes a program to enable the processor of the lottery server 806 to perform some or all of the various steps and functions of at least one implementation of the methods described in detail herein. In addition, the data storage device of the lottery server 806 may operate to store one or more databases including a lottery ticket database and a lottery ticket redemption status database.

In various example embodiments, the lottery server 806 includes a lottery ticket server device that is located at a lottery ticket printing facility, and may also function to manage the ticket printing process. The lottery server 806 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 802-1) of FIG. 7 is configured to perform some or all of the functions of the lottery server 806. Thus, in certain example embodiments, the lottery server 806 and the retailer terminal (such as the first retailer terminal 802-1) (or another given retailer terminal and server pairing) may be considered as the same "device."

Generally, the communications network 804 of FIG. 7 includes one or more local and/or wide-area network(s) proprietary and/or public network(s) (e.g., the Internet) for facilitating two-way data communications between the retailer terminals 802 and the lottery server 806. The lottery server 806 may communicate with lottery retailer terminals 802 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 806, and communication between the lottery retailer terminals 802 and the lottery server 806 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket comprising:
- a substrate;
- a plurality of winning symbols on the substrate;
- a plurality of separate player symbol zones on the substrate, each player symbol zone comprising:
  - a plurality of player first symbols,
  - a plurality of award symbols respectively associated with the plurality of player first symbols,
  - a player bonus award symbol independent from the plurality of player first symbols,
  - a first award associated with the player first symbols, and a second award associated with the player bonus award symbol and not the winning symbols;

wherein, for one of the player symbol zones, the player bonus award symbol indicates a zero bonus award;

a first removable covering on the substrate covering the plurality of player symbol zones; and a second removable covering on the substrate covering the plurality of winning symbols.

2. The lottery ticket of claim 1, which comprises four symmetrically arranged player symbol zones.

3. The lottery ticket of claim 1, wherein the plurality of winning symbols are randomly selected, and wherein for each player symbol zone, the plurality of player first symbols are independently randomly selected.

4. The lottery ticket of claim 1, wherein the first award comprises a plurality of awards, each associated with a player first symbol in the player symbol zone.

5. The lottery ticket of claim 4, further comprising, for each player symbol zone, a third award for the winning symbols matching all of the player first symbols in said player symbol zone, the third award being in addition to the first award associated with the player first symbols of said player symbol zone.

6. The lottery ticket of claim 5, wherein, for each player symbol zone, an indication of the third award is present in said player symbol zone.

7. The lottery ticket of claim 1, wherein the lottery ticket comprises four separate player symbol zones.

8. The lottery ticket of claim 1, which is a physical lottery ticket, wherein the first removeable covering is a first scratch-off coating on the substrate, and the second removable coating is a second scratch-off coating on the substrate.

9. The lottery ticket of claim 1, which is a virtual lottery ticket.

10. A lottery ticket comprising:

a substrate;

a plurality of player symbol zones on the substrate, each player symbol zone comprising:

a plurality of player number symbols, a plurality of primary monetary award symbols respectively associated with the plurality of player number symbols, and a player monetary bonus award symbol independent from the plurality of player number symbols;

wherein, for each of a plurality of the player symbol zones, the player bonus award symbol of that player symbol zone indicates a zero bonus award;

a plurality of winning number symbols on the substrate;

a first removable covering on the substrate covering the plurality of player symbol zones;

a second removable covering on the substrate covering the plurality of winning symbols; and wherein a plurality of awards are associated with the plurality of player symbol zones, the plurality of awards comprising: (i) for one of the player symbol zones, a first type award for any of the winning number symbols that match any of the player number symbols in that player symbol zone, and (ii) for one of the player symbol zones, a second type award based on the player monetary bonus award symbol and regardless of any of the winning number symbols.

11. The lottery ticket of claim 10, which comprises four separate player symbol zones.

12. The lottery ticket of claim 10, which is a physical lottery ticket, wherein the first removeable covering is a first scratch-off coating on the substrate, and the second removable coating is a second scratch-off coating on the substrate.

13. The lottery ticket of claim 10, which is a virtual lottery ticket.

14. A lottery gaming system comprising:

a processor; and a memory device that stores a plurality of instructions, that when executed by the processor, cause the processor to cause a lottery ticket to be created, the lottery ticket comprising:

a substrate;

a plurality of winning symbols on the substrate;

a plurality of player symbol zones on the substrate, each player symbol zone comprising:

a plurality of player first symbols, a plurality of award symbols respectively associated with the plurality of player first symbols, a player monetary bonus award symbol independent from the plurality of player first symbols, a first award associated with the player first symbols, and a second award associated with the player bonus award symbol and not the winning symbols;

wherein, for one of the player symbol zones, the player bonus award symbol indicates a zero bonus award;

a first removable covering on the substrate covering the plurality of player symbol zones; and a second removable covering on the substrate covering the plurality of winning symbols.

15. The lottery gaming system of claim 14, wherein the lottery ticket comprises more than three player symbol zones.

16. The lottery gaming system of claim 15, wherein the lottery ticket further comprises a third award for the winning symbols matching all of the player first symbols in that player symbol zone.

17. The lottery gaming system of claim 16, wherein the third award is present in each player symbol zone.

18. The lottery gaming system of claim 15, wherein the first award comprises a plurality of awards, each associated with a player first symbol in the player symbol zone.

19. The lottery gaming system of claim 15, wherein the lottery ticket is a physical ticket, the first removeable covering is a first scratch-off coating on the substrate, and the second removable coating is a second scratch-off coating on the substrate.

20. The lottery gaming system of claim 15, wherein the lottery ticket is a virtual ticket.

* * * * *